(12) United States Patent
Wang

(10) Patent No.: US 10,768,812 B2
(45) Date of Patent: Sep. 8, 2020

(54) METHOD, TERMINAL, AND STORAGE MEDIUM FOR OPERATING OBJECTS DISPLAYED ON A GRAPHICAL USER INTERFACE

(71) Applicant: TENCENT TECHNOLOGY (SHENZHEN) COMPANY LIMITED, Shenzhen (CN)

(72) Inventor: Haosu Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 118 days.

(21) Appl. No.: 15/856,840

(22) Filed: Dec. 28, 2017

(65) Prior Publication Data

US 2018/0121086 A1 May 3, 2018

Related U.S. Application Data

(63) Continuation of application No. PCT/CN2016/083209, filed on May 24, 2016.

(30) Foreign Application Priority Data

Oct. 10, 2015 (CN) .......................... 2015 1 0655670

(51) Int. Cl.
*G06F 3/048* (2013.01)
*G06F 3/041* (2006.01)
(Continued)

(52) U.S. Cl.
CPC ........ *G06F 3/04886* (2013.01); *A63F 13/426* (2014.09); *G06F 3/0484* (2013.01); *G06F 3/04883* (2013.01); *G06F 9/451* (2018.02)

(58) Field of Classification Search
CPC ............. G06F 3/048; G06F 3/041; G06F 3/00
See application file for complete search history.

(56) References Cited

U.S. PATENT DOCUMENTS 9,009,621 B2 4/2015 Ahn et al.
9,250,789 B2* 2/2016 Kobayashi ............ G06F 3/0488
(Continued)

FOREIGN PATENT DOCUMENTS

CN 103785170 A 5/2014
CN 104076986 A 10/2014
(Continued)

OTHER PUBLICATIONS

The Japan Patent Office (JPO) Notification of Reasons for Refusal for Application No. 2017-555358 dated Oct. 30, 2018 10 Pages (including translation).
(Continued)

*Primary Examiner* — Hugo Molina
(74) *Attorney, Agent, or Firm* — Anova Law Group, PLLC

(57) ABSTRACT

In one aspect, a method of operating objects displayed on a graphical user interface (GUI) includes: displaying on the GUI a skill indicator object; performing rendering, at one of a pre-set location and a wheel rendering location on the GUI, to obtain a skill-release supplementary control object, when detecting a skill-release trigger gesture on a skill object displayed on the graphical user interface, the skill-release supplementary control object including a skill-release control halo object and a virtual joystick object located within a radiation range of the skill-release control halo object; positioning the skill-release control halo object within the skill indicator object; adjusting, when detecting a drag operation on the virtual joystick object, a skill release location of the skill object on the GUI; and performing a
(Continued)

skill release operation on the skill object when detecting a release operation of the drag operation.

20 Claims, 9 Drawing Sheets

(51) Int. Cl.
*G06F 3/0488* (2013.01)
*G06F 3/0484* (2013.01)
*A63F 13/426* (2014.01)
*G06F 9/451* (2018.01)

(56) References Cited

U.S. PATENT DOCUMENTS

| | | | |
|---|---|---|---|
| 2003/0115117 A1* | 6/2003 | Sugimoto | G06Q 30/06 705/27.1 |
| 2011/0077083 A1 | 3/2011 | Ann et al. | |
| 2011/0172013 A1 | 7/2011 | Shirasaka et al. | |
| 2011/0285636 A1* | 11/2011 | Howard | G06F 3/04815 345/173 |
| 2013/0342460 A1 | 12/2013 | Vincent et al. | |
| 2014/0344766 A1* | 11/2014 | Cao | G06F 3/017 715/863 |
| 2015/0049058 A1 | 2/2015 | Mao et al. | |
| 2015/0089407 A1* | 3/2015 | Suzuki | G06F 3/0482 715/763 |
| 2015/0378459 A1* | 12/2015 | Sawada | G06F 3/0488 345/173 |
| 2017/0269800 A1* | 9/2017 | Park | G06F 3/0486 |

FOREIGN PATENT DOCUMENTS

| | | |
|---|---|---|
| CN | 104267904 A | 1/2015 |
| CN | 104898953 A | 9/2015 |
| CN | 105194873 A | 12/2015 |
| CN | 105335065 A | 2/2016 |
| JP | 2011141632 A | 7/2011 |
| WO | 2014200255 A1 | 12/2014 |

OTHER PUBLICATIONS

The European Patent Office (EPO) the Extended European Search Report for 16852993.1 dated Nov. 26, 2018 12 Pages.

Korean Intellectual Property Office (KIPO) Office Action 1 for 10-2017-7035796 dated Mar. 29, 2019 9 Pages (including translation).

The World Intellectual Property Organization (WIPO) International Search Report for PCT/CN2016/083209 dated Aug. 30, 2016 6 Pages (including translation).

Canadian Intellectual Property Office Application No. 2981554 dated Aug. 29, 2018 5 Pages.

The State Intellectual Property Office of the People's Republic of China (SIPO) Office Action 1 for 201510655670.1 dated Dec. 25, 2017 13 Pages (including translation).

Tencent game, "The king glory novice must see the casting skills of N positions—tencent's first 5v5 hero fair play mobile game", http://pvp.qq.com/webplat/info/news_version3/15592/18024/18031/18034/m13041/201510/393462.shtml, Aug. 4, 2015 7 Pages (including translation).

* cited by examiner

METHOD, TERMINAL, AND STORAGE MEDIUM FOR OPERATING OBJECTS DISPLAYED ON A GRAPHICAL USER INTERFACE

RELATED APPLICATIONS

This patent application is a continuation application of PCT Patent Application No. PCT/CN2016/083209, filed on May 24, 2016, which claims priority to Chinese Patent Application No. 201510655670.1, filed by Tencent Technology (Shenzhen) Company Limited on Oct. 10, 2015, and entitled "INFORMATION PROCESSING METHOD, TERMINAL, AND COMPUTER STORAGE MEDIUM", which is incorporated by reference in its entirety.

FIELD OF THE TECHNOLOGY

The present disclosure generally relates to communications technologies, and in particular, relates to an information processing method, a terminal, and a storage medium.

BACKGROUND OF THE DISCLOSURE

With gradual popularization of large-screen and super-screen intelligent terminals, a processor of an intelligent terminal has an increasingly high processing capability, so that many applications, for implementing a control based on man-machine interaction, appear on a large screen or a super large screen. In a process of implementing a control based on man-machine interaction, multiple users may run different interaction modes, by creating groups in one-to-one, one-to-many, and many-to-many forms, to obtain different interaction results. For example, in a graphical user interface obtained through rendering on a large screen or a super large screen, after multiple users are grouped into two different groups, by controlling the processing in man-machine interaction, information exchange may be performed between different groups, and different interaction results are obtained according to a response to information exchange; and by controlling the processing in man-machine interaction, information exchange may further be performed between group members in a same group, and different interaction results are obtained according to a response to information exchange.

Conventionally, release of a particular skill may be triggered to enrich a presentation form and content of information, and different presentation forms and content of information may finally lead to different interaction results. However, when releasing a particular skill, a skill release location and direction cannot be accurately determined, leading to occurrence of a large quantity of mis-operations, and affecting precision and accuracy of interaction processing.

SUMMARY

One aspect of present disclosure provides an information processing method by a processor, the method including: performing rendering in a graphical user interface, to obtain at least one virtual resource object; performing rendering, at one of a pre-set location and a wheel rendering location in the graphical user interface, to obtain a skill-release supplementary control object, when detecting a skill-release trigger gesture on at least one skill object located in at least one skill operation area in the graphical user interface, the skill-release supplementary control object including a skill-release control halo object and a virtual joystick object located within a radiation range of the skill-release control halo object; controlling, when detecting a drag operation on the virtual joystick object, a skill release location of the skill object to be correspondingly adjusted in the graphical user interface; and performing a skill release operation on the skill object when detecting a release operation of the drag operation.

Another aspect of present disclosure provides a terminal. The terminal includes a memory, storing computer readable instructions for an information processing method; a display for providing a graphical user interface; and a processor, coupled to the memory and, when executing the program instructions, configured to: perform the rendering in the graphical user interface, to obtain at least one virtual resource object; perform rendering at one of a pre-set location and a wheel rendering location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object; control, when detecting a drag operation on the virtual joystick object, a skill release location of the skill object to be correspondingly adjusted in the graphical user interface; and perform a skill release operation on the skill object when a release operation of the drag operation is detected.

Another aspect of present disclosure provides a non-transitory computer-readable storage medium containing computer-executable program instructions for, when executed by a processor, performing an information processing method. the method including: performing rendering in a graphical user interface, to obtain at least one virtual resource object; performing rendering, at one of a pre-set location and a wheel rendering location in the graphical user interface, to obtain a skill-release supplementary control object, when detecting a skill-release trigger gesture on at least one skill object located in at least one skill operation area in the graphical user interface, the skill-release supplementary control object including a skill-release control halo object and a virtual joystick object located within a radiation range of the skill-release control halo object; controlling, when detecting a drag operation on the virtual joystick object, a skill release location of the skill object to be correspondingly adjusted in the graphical user interface; and performing a skill release operation on the skill object when detecting a release operation of the drag operation.

DESCRIPTION OF EMBODIMENTS

Implementation of the technical solutions is further described in detail below with reference to the accompanying drawings.

Various embodiments of the present disclosure provide an information processing method, a terminal, and a storage medium. The present disclosure solves technical problems in the existing technology, so that a skill release location and direction can be accurately determined, thereby avoiding occurrence of a large quantity of mis-operations, and improving precision and accuracy of interaction processing.

Figure 1:
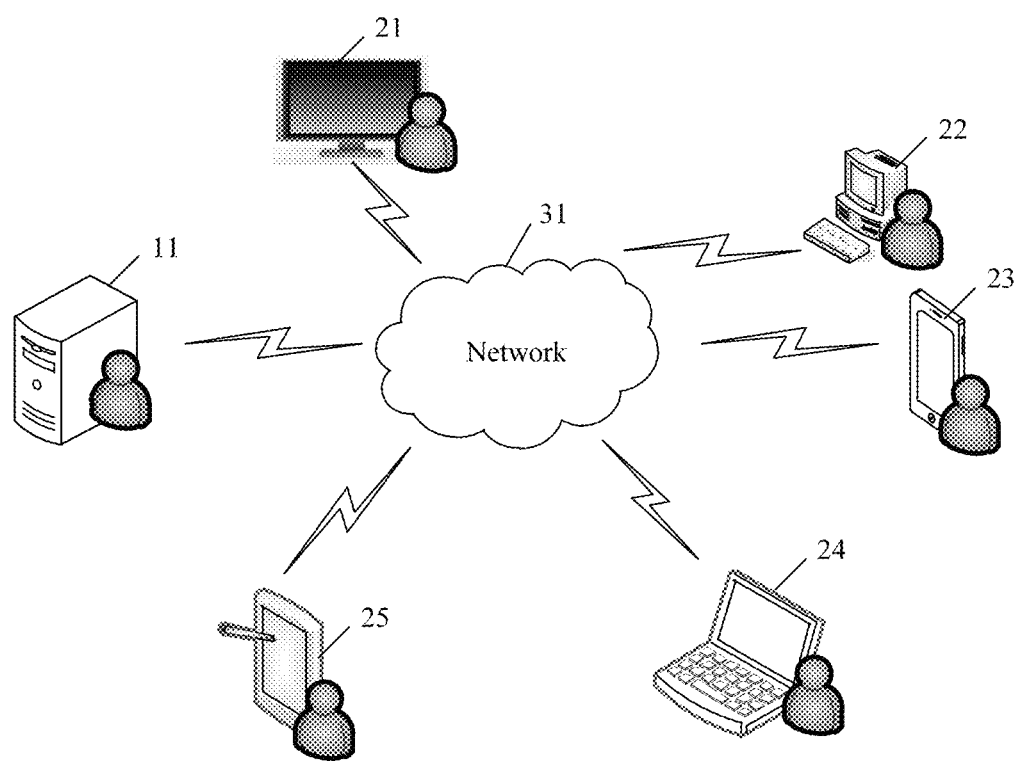
FIG. 1 is a schematic diagram of an exemplary system for performing information exchange according to some embodiments of the present disclosure.

FIG. 1 is a schematic diagram of an exemplary system for performing information exchange according to some embodiments of the present disclosure. The exemplary system in FIG. 1 includes: one or more servers, where a server 11 in FIG. 1 is merely an example for illustration purposes, terminal devices 21 to 25, and a network 31. The network 31 includes network entities such as a router and a gateway, which are not shown in the figure. The terminal devices 21 to 25 perform information exchange with the server by using a wired network or a wireless network, so as to download an application and/or an application update data packet and/or application related data information or service information from the server 11. A type of the terminal device is shown in FIG. 1, and includes a mobile phone (the terminal 23), a tablet computer or a PDA (the terminal 25), a desktop computer (the terminal 22), a PC (the terminal 24), an all-in-one PC (the terminal 21), and other types. Various applications, for example, an application having an entertainment function (such as a video application, an audio play application, a game application, or reading software) or an application having a serving function (such as a map navigation application, or a group purchasing application), required by a user are installed in the terminal device.

Based on a system shown in FIG. 1, a game scene is used as an example. The terminal devices 21 to 25 download, by using the network 31, a game application and/or a game application update data packet and/or game application related data information or service information from the server 11 according to a requirement. As such, after the game application is started on the terminal device and a game interface obtained through rendering is entered, rendering is performed at a pre-set location in the graphical user interface, to obtain a skill-release supplementary control object when a skill-release trigger gesture on at least one skill object located in at least one skill operation area in the game interface is detected, the skill-release supplementary control object including a skill-release control halo object and a virtual joystick object located within a radiation range of the skill-release control halo object; a skill release location of the skill object is controlled, when a drag operation on the virtual joystick object is detected, to be correspondingly adjusted in the graphical user interface; and a skill release operation is performed on the skill object when a release operation of the drag operation is detected. The skill-release supplementary control object can appear at the pre-set location, that is, a default fixed location, so that a user can be facilitated to respond rapidly in an information exchange process, thereby avoiding a response time wasted by the user for searching the graphical user interface. A control area is stable, which can facilitate the user to rapidly specify a skill releasable range. The skill release operation can be accurately performed on the skill object within the skill releasable range according to a release location and/or direction of the skill object that is obtained by dragging the virtual joystick object to move by a skill-release operation gesture, thereby avoiding occurrence of a large quantity of mis-operations, and improving precision and accuracy of interaction processing.

The example in FIG. 1 is an example of a system architecture for implementing the embodiments of the present disclosure, and the embodiments of the present disclosure are not limited to the system architecture in FIG. 1. Based on the system architecture, various embodiments of the present disclosure are provided.

Figure 2:
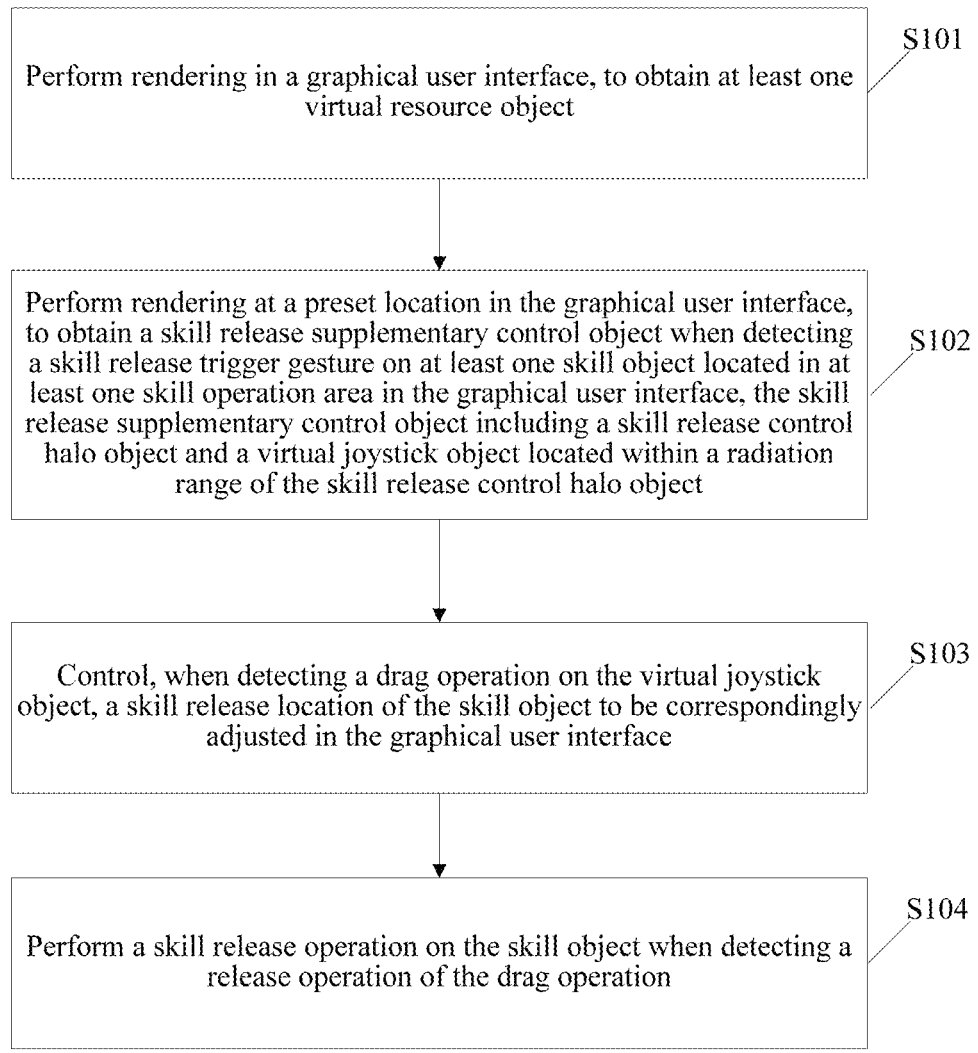
FIG. 2 is a schematic flowchart of an exemplary information processing method according to some embodiments of the present disclosure.

Various embodiments of the present disclosure provide an information processing method. Computer readable instructions such as a software application may be executed on a processor of a terminal and rendering is performed and displayed on a display of the terminal, to provide a graphical user interface. The processor, the graphical user interface, and/or the software application are implemented in a game system. As shown in FIG. 2, the method includes the following exemplary steps.

In S101: Performing rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

In S102: Performing rendering at a pre-set location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object.

Herein, rendering is performed at the pre-set location in the graphical user interface, to obtain the skill-release supplementary control object, so as to display the skill-release supplementary control object at a default fixed location. The skill-release supplementary control object can appear at the pre-set location, that is, the default fixed location, so that a user can be facilitated to respond rapidly in an information exchange process, thereby avoiding a response time wasted by the user for searching the graphical user interface. For example, in a specific operation process, the user triggers and invokes the skill-release control halo object (for example, a wheel) by tapping a skill button. In this case, the user lifts a finger, and specific skill release is controlled by controlling the virtual joystick object (for example, a virtual joystick).

Figure 3:
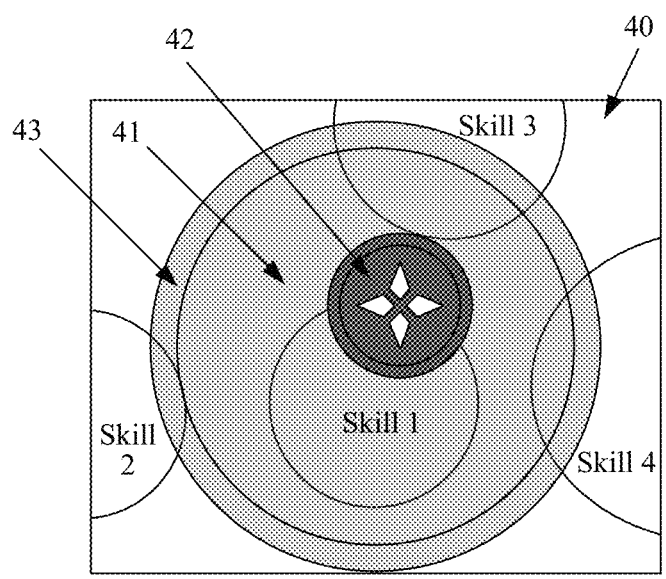
FIG. 3 is a schematic diagram of an exemplary application of an exemplary obtained user interaction interface (UI) according to some embodiments of the present disclosure.

Herein, as shown in FIG. 3, in a skill operation area 40 in a graphical user interface, a skill-release operation gesture applied to a skill object 1 is obtained, and rendering is performed, to obtain a skill-release supplementary control object. The skill-release supplementary control object includes a skill-release control halo object 41 and a virtual joystick object 42. A skill release control operation is subsequently triggered, so that a location of the skill-release control halo object 41 remains unchanged, and a skill releasable range specified by a skill indicator object 43 is completely covered by an area where the skill-release control halo object 41 is located.

For example, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. Herein, it should be noted that, the skill-release control halo object and the virtual joystick object used in this specification are only examples of a skill release controller object and a joystick object. A skill release controller object and a joystick object that are obtained by performing rendering in a graphical user interface include, but are not limited to, a shape of a wheel, an annular shape, a ring shape, and other shapes, as long as objects that may be configured to implement skill control can be implemented.

Figure 4:
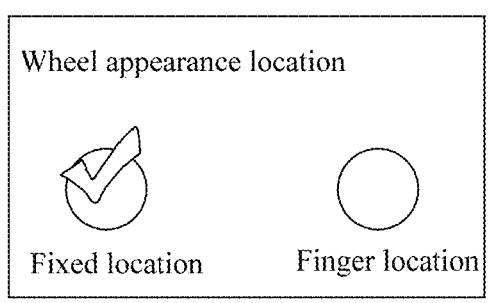
FIG. 4 is a schematic diagram of an exemplary system setting interface for generating an UI effect corresponding to FIG. 3.

A schematic diagram of a UI effect interface shown in FIG. 3 is obtained by settings shown in FIG. 4. FIG. 4 is a schematic diagram of a system setting interface. When a user selects an option to set a wheel appearance location to a fixed location, to match a setting of the user, a UI shown in FIG. 3 is obtained by performing rendering subsequently. In the UI, a center of the joystick deviates from a center of the wheel, and the skill release control operation is triggered, so that the location of the wheel remains unchanged, and the skill releasable range specified by the skill indicator is completely covered by the area where the wheel is located.

In S103: Controlling, when detecting a drag operation on the virtual joystick object, a skill release location of the skill object to be correspondingly adjusted in the graphical user interface.

Herein, when it is detected that the virtual joystick object is dragged to move by the skill-release operation gesture, the virtual joystick object deviates from a center of the skill-release control halo object, and the skill release control operation is triggered, so that a location of the skill-release control halo object remains unchanged, and the skill releasable range specified by the skill indicator object is completely covered by the area where the skill-release control halo object is located.

In S104: Performing a skill release operation on the skill object when detecting a release operation of the drag operation.

Herein, the skill release operation is performed on the target character object within the skill releasable range in S103 according to a release location and/or direction of the skill object that is obtained by dragging the virtual joystick object to move by the skill-release operation gesture.

Herein, in the UI shown in FIG. 3, when moving with the skill-release operation gesture, when the virtual joystick object moves towards the upper right corner of the wheel, skill release is performed, within the skill releasable range, on a character object that appears at the upper right corner.

In a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple online users and the offline versus mode without an Internet connection are both applicable to the UI shown in FIG. 3. Herein, it should be noted that, the UI shown in FIG. 3 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a fixed location. For example, for the versus mode between multiple online users, the multiple users are grouped into different groups, each group includes at least one group member, and the different groups are marked as at least a first group (for example, our group) and a second group (for example, an opponent group). When there is only one person in our group, and there is also only one person in the opponent group, it is the "1 to 1" mode mentioned above. When there are only three persons in our group, and there are also three persons in the opponent group, it is the "3 to 3" mode mentioned above. When there are only five persons in our group, and there are also only five persons in the opponent group, it is the"5 to 5" mode mentioned above. Certainly, for the opponent group and our group, it is not necessarily to deploy a same number of persons, and different numbers of persons may be deployed.

In an implementation of this exemplary embodiment of the present disclosure, in a process of detecting the drag operation on the virtual joystick object, the method includes:

obtaining a first pre-set policy when detecting that the drag operation on the virtual joystick object makes a current first coordinate location be out of the radiation range of the skill-release control halo object, and mapping the first coordinate location to a second coordinate location according to the first pre-set policy, where the second coordinate location is within the radiation range of the skill-release control halo object.

Figure 5:
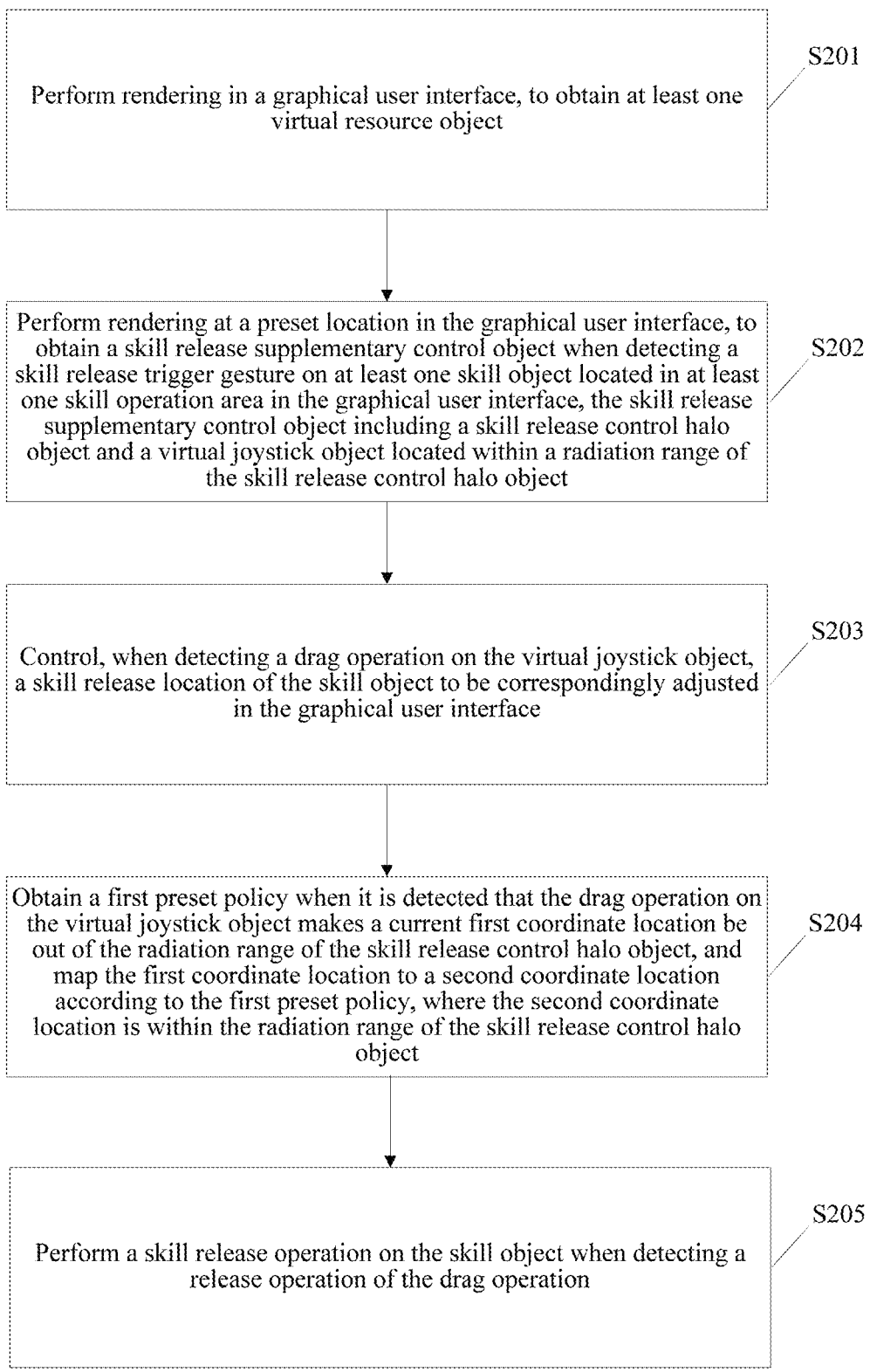
FIG. 5 is a schematic flowchart of an exemplary information processing method according to some embodiments of the present disclosure.

Various embodiments of the present disclosure provide an information processing method. Computer readable instructions such as a software application may be executed on a processor of a terminal and rendering is performed and displayed on a display of the terminal, to provide a graphical user interface. The processor, the graphical user interface, and/or the software application are implemented in a game system. As shown in FIG. 5, the method includes the following exemplary steps.

In S201: Performing rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

In S202: Performing rendering at a pre-set location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object.

Herein, rendering is performed at the pre-set location in the graphical user interface, to obtain the skill-release supplementary control object, so as to display the skill-release supplementary control object at a default fixed location. The skill-release supplementary control object can appear at the pre-set location, that is, the default fixed location, so that a user can be facilitated to respond rapidly in an information exchange process, thereby avoiding a response time wasted by the user for searching the graphical user interface.

Herein, as shown in FIG. 3, in a skill operation area 40 in a graphical user interface, a skill-release operation gesture applied to a skill object 1 is obtained, and rendering is performed, to obtain a skill-release supplementary control object. The skill-release supplementary control object includes a skill-release control halo object 41 and a virtual joystick object 42. A skill release control operation is subsequently triggered, so that a location of the skill-release control halo object 41 remains unchanged, and a skill releasable range specified by a skill indicator object 43 is completely covered by an area where the skill-release control halo object 41 is located.

For example, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. Herein, it should be noted that, the skill-release control halo object and the virtual joystick object used in this specification are only examples of a skill release controller object and a joystick object. A skill release controller object and a joystick object that are obtained by performing rendering in a graphical user interface include, but are not limited to, a shape of a wheel, an annular shape, a ring shape, and other shapes, as long as objects that may be configured to implement skill control can be implemented.

A schematic diagram of a UI effect interface shown in FIG. 3 is obtained by settings shown in FIG. 4. FIG. 4 is a schematic diagram of a system setting interface. When a user selects an option to set a wheel appearance location to a fixed location, to match a setting of the user, a UI shown in FIG. 3 is obtained by performing rendering subsequently. In the UI, a center of the joystick deviates from a center of the wheel, and the skill release control operation is triggered, so that the location of the wheel remains unchanged, and the skill releasable range specified by the skill indicator is completely covered by the area where the wheel is located.

In S203: Controlling, when detecting a drag operation on the virtual joystick object, a skill release location of the skill object to be correspondingly adjusted in the graphical user interface.

In S204: Obtaining a first pre-set policy when it is detected that the drag operation on the virtual joystick object makes a current first coordinate location be out of the radiation range of the skill-release control halo object, and map the first coordinate location to a second coordinate location according to the first pre-set policy, where the second coordinate location is within the radiation range of the skill-release control halo object.

Herein, the first coordinate location is mapped to the second coordinate location by using the first pre-set policy, to fix an actual location of the virtual joystick object in the area where the skill-release control halo object is located.

Herein, when the virtual joystick object moves with the skill-release operation gesture, the virtual joystick object deviates from a center of the skill-release control halo object, and the skill release control operation is triggered, so that the location of the skill-release control halo object remains unchanged, and the skill releasable range specified by the skill indicator object is completely covered by the area where the skill-release control halo object is located.

Herein, an example in which a first location that the virtual joystick object moves along with the skill-release operation gesture meets a pre-set condition is that: when the first location is at an edge of the area where the skill-release control halo object is located, the pre-set condition is met. In this case, in the existing technology, it is considered that it is out of a threshold, and a skill release operation is canceled. In contrast, as disclosed herein, when the pre-set condition is met, a skill release operation is not canceled.

Herein, another example in which a first location that the virtual joystick object moves along with the skill-release operation gesture meets a pre-set condition is that: when the first location is out of the area where the skill-release control halo object is located, the pre-set condition is met. In this case, in the existing technology, it is considered that it is out of a threshold, and a skill release operation is canceled. In contrast, as disclosed herein, when the pre-set condition is met, a skill release operation is not canceled.

Figure 6:
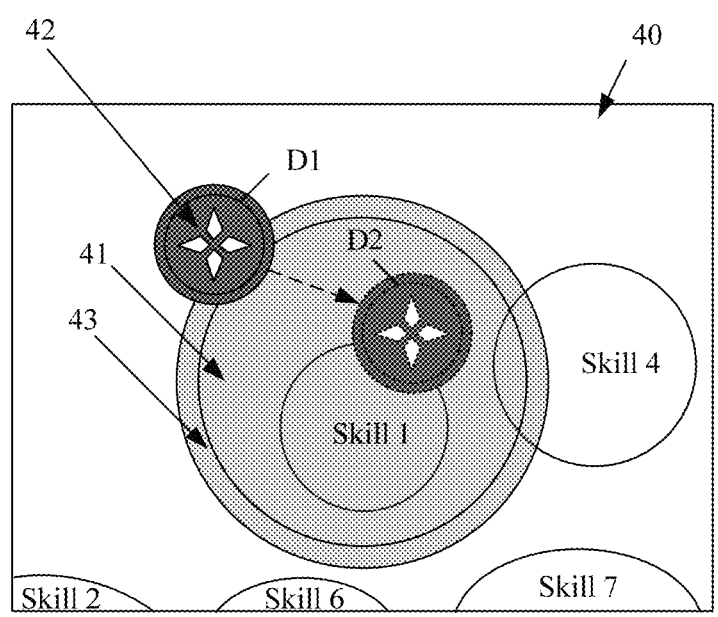
FIG. 6 is a schematic diagram of an exemplary application of another exemplary obtained UI according to some embodiments of the present disclosure.

Herein, it should be noted that, different from the first location, a second location is in the area where the skill-release control halo object is located. FIG. 6 is a schematic diagram of a relative setting of a first location and a second location. The first location D1 is an actual location of the virtual joystick object 42, and the second location D2 is a location, in the area where the skill-release control halo object 41 is located, that the virtual joystick object 42 is mapped to. As can be learned from the figure, the actual location of the virtual joystick object 42 is at an edge of the skill-release control halo object 41. In this case, in the existing technology, it is considered that it is out of a threshold, and a skill release operation is canceled. In contrast, as disclosed herein, the pre-set condition is met, the virtual joystick object 42 is mapped to the location in the area where the skill-release control halo object is located, and a skill release operation is not canceled. Then, the exemplary step 204 is performed, to perform the skill release operation in the area where the skill-release control halo object is located.

In S205: Performing a skill release operation on the skill object when detecting a release operation of the drag operation.

Herein, the skill release operation is performed on the skill object in the area where the skill-release control halo object is located in S203 and S204 according to a release location and/or direction of the skill object that is obtained through movement of the virtual joystick object with the skill-release operation gesture.

Herein, in the UI shown in FIG. 3, when moving with the skill-release operation gesture, when the virtual joystick object moves towards the upper right corner of the wheel, skill release is performed, within the skill releasable range, on a character object that appears at the upper right corner.

In a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to the UI shown in FIG. 3. Herein, it should be noted that, the UI shown in FIG. 3 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a fixed location. For example, for the versus mode between multiple online users, the multiple users are grouped into different groups, each group includes at least one group member, and the different groups are marked as at least a first group (for example, our group) and a second group (for example, an opponent group). When there is only one person in our group, and there is also only one person in the opponent group, it is the "1 to 1" mode mentioned above. When there are only three persons in our group, and there are also three persons in the opponent group, it is the "3 to 3" mode mentioned above. When there are only five persons in our group, and there are also only five persons in the opponent group, it is the "5 to 5" mode mentioned above. Certainly, for the opponent group and our group, it is not necessarily to deploy a same number of persons, and different numbers of persons may be deployed.

In an implementation of this exemplary embodiment of the present disclosure, the performing the skill release operation on the target character object within the skill releasable range according to a release location and/or direction of the skill object that is obtained through movement of the virtual joystick object with the skill-release operation gesture further includes:

determining, when detecting that the virtual joystick object moves with the skill-release operation gesture, when the skill-release operation gesture changes to a slide release state from a slide state, that it is a skill release operation currently; and selecting, from at least one character object within a skill releasable range centering around a current user character object, a character object satisfying a second pre-set policy as the target character object having the highest priority, and performing, on the target character object, the skill release operation as on the skill object.

In an implementation of this exemplary embodiment of the present disclosure, the method further includes: setting, or updating, according to a user requirement, a drag speed value of movement of the virtual joystick object along with a skill-release operation gesture, to conform to a change speed of a skill releasable range specified by a skill indicator object.

Figure 7:
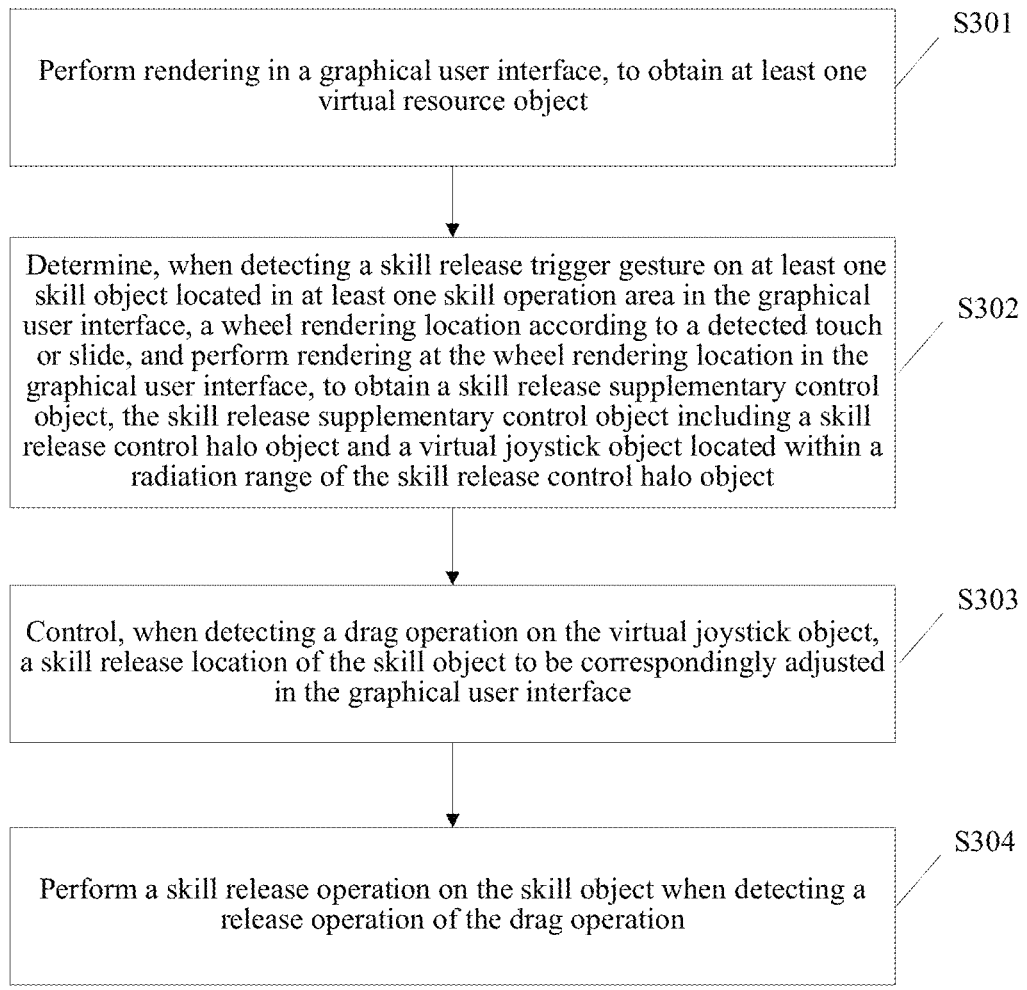
FIG. 7 is a schematic flowchart of an exemplary information processing method according to some embodiments of the present disclosure.

Various embodiments of the present disclosure provide an information processing method. Computer readable instructions such as a software application may be executed on a processor of a terminal and rendering is performed and displayed on a display of the terminal, to provide a graphical user interface. The processor, the graphical user interface, and/or the software application are implemented in a game system. As shown in FIG. 7, the method includes the following exemplary steps.

In S301: Performing rendering in the graphical user interface, to obtain at least one virtual resource object.

Herein, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

In S302: Determining, when detecting a skill-release trigger gesture on at least one skill object located in at least one skill operation area in the graphical user interface, a wheel rendering location according to a detected touch or slide, and perform rendering at the wheel rendering location in the graphical user interface, to obtain a skill-release supplementary control object, the skill-release supplementary control object including a skill-release control halo object and a virtual joystick object located within a radiation range of the skill-release control halo object.

Herein, a first location (for example, the wheel rendering location) may be obtained with a touch or a slide of a finger, and rendering is performed at the first location in the graphical user interface, to obtain the skill-release supplementary control object, so as to display the skill-release supplementary control object at a changeable location with a touch or a slide of the finger. The skill-release supplementary control object can appear at a changeable location with a touch or a slide of the finger. Therefore, a requirement of a user having a habit of rapidly performing skill release by a slide of the finger, which is different from a requirement of a user having a habit of performing skill release at a fixed location and aiming in a stable control area to perform skill release, can be well met, so that the user is facilitated to respond rapidly in an information exchange process, thereby avoiding a response time wasted by the user for searching the graphical user interface.

Figure 8:
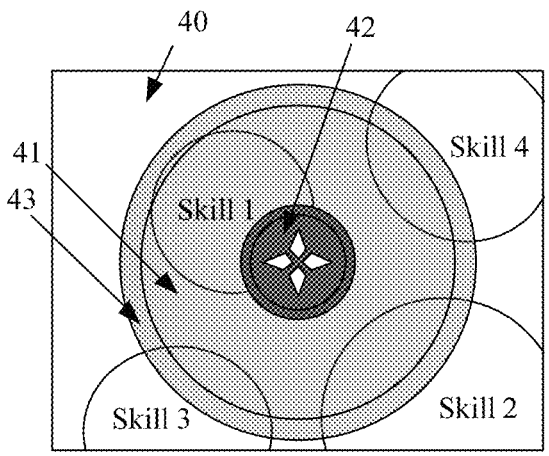
FIG. 8 is a schematic diagram of application of another exemplary obtained UI according to some embodiments of the present disclosure.

Herein, as shown in FIG. 8, in a skill operation area 40 in a graphical user interface, a skill-release operation gesture applied to a skill object 1 is obtained, and rendering is performed, to obtain a skill-release supplementary control object. The skill-release supplementary control object includes a skill-release control halo object 41 and a virtual joystick object 42. A skill release control operation is subsequently triggered, so that the skill-release control halo object 41 synchronously moves with the virtual joystick object with a touch or a slide of a finger, and a skill releasable range specified by a skill indicator object 43 is completely covered by an area where the skill-release control halo object 41 is located.

For example, as shown in FIG. 8, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. Herein, it should be noted that, the skill-release control halo object and the virtual joystick object used in this specification are only examples of a skill release controller object and a joystick object. A skill release controller object and a joystick object that are obtained by performing rendering in a graphical user interface include, but are not limited to, a shape of a wheel, an annular shape, a ring shape, and other shapes, as long as objects that may be configured to implement skill control can be implemented.

Figure 9:
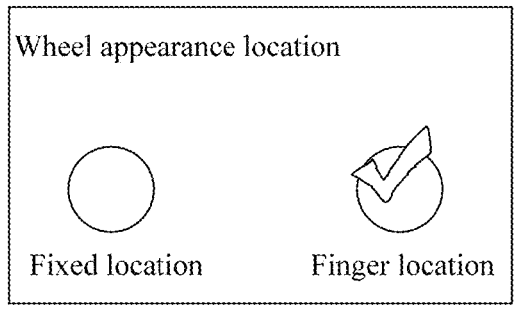
FIG. 9 is a schematic diagram of an exemplary system setting interface for generating an UI effect corresponding to FIG. 8.

A schematic diagram of a UI effect interface shown in FIG. 8 is obtained by settings shown in FIG. 9. FIG. 9 is a schematic diagram of a system setting interface. When a user selects an option to set a wheel appearance location to a finger location, to match a setting of the user, a UI shown in FIG. 8 is obtained by performing rendering subsequently. In the UI, a center of the joystick overlaps a center of the skill-release control halo object, and the skill release control operation is subsequently triggered, so that the skill releasable range specified by the skill indicator object is completely covered by the area where the skill-release control halo object is located.

In S303: Controlling, when detecting a drag operation on the virtual joystick object, a skill release location of the skill object to be correspondingly adjusted in the graphical user interface.

Herein, when it is detected that the virtual joystick object is dragged to move by the skill-release operation gesture, the virtual joystick object overlaps the center of the skill-release control halo object, so that the skill-release control halo object synchronously moves with the virtual joystick object with a touch or a slide of the finger, and the skill releasable range specified by the skill indicator object is completely covered by the area where the skill-release control halo object is located.

In S304: Performing a skill release operation on the skill object when detecting a release operation of the drag operation.

Herein, the skill release operation is performed on the target character object within the skill releasable range in S303 according to a release location and/or direction of the skill object that is obtained through movement of the virtual joystick object with the skill-release operation gesture.

Herein, in the UI shown in FIG. 8, when moving with the skill-release operation gesture, when the virtual joystick object moves towards the upper right corner of the wheel, skill release is performed, within the skill releasable range, on a character object that appears at the upper right corner.

In a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to the UI shown in FIG. 8. Herein, it should be noted that, the UI shown in FIG. 8 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a changeable location. For example, for the versus mode between multiple online users, the multiple users are grouped into different groups, each group includes at least one group member, and the different groups are marked as at least a first group (for example, our group) and a second group (for example, an opponent group). When there is only one person in our group, and there is also only one person in the opponent group, it is the "1 to 1" mode mentioned above. When there are only three persons in our group, and there are also three persons in the opponent group, it is the "3 to 3" mode mentioned above. When there are only five persons in our group, and there are also only five persons in the opponent group, it is the"5 to 5" mode mentioned above. Certainly, for the opponent group and our group, it is not necessarily to deploy a same number of persons, and different numbers of persons may be deployed.

In an implementation of this exemplary embodiment of the present disclosure, the performing the skill release operation on the target character object within the skill releasable range according to a release location and/or direction of the skill object that is obtained through movement of the virtual joystick object with the skill-release operation gesture further includes:

In S401: Determining, when detecting that the virtual joystick object moves with the skill-release operation gesture, when the skill-release operation gesture changes to a slide release state from a slide state, that it is a skill release operation currently.

In S402: Selecting, from at least one character object within a skill releasable range centering around a current user character object, a character object satisfying a second pre-set policy as the target character object having the highest priority, and performing, on the target character object, the skill release operation as on the skill object.

In an implementation of this exemplary embodiment of the present disclosure, the method further includes: setting, or updating, according to a user requirement, a drag speed value of movement of the virtual joystick object along with a skill-release operation gesture, to conform to a change speed of a skill releasable range specified by a skill indicator object.

Figure 10:
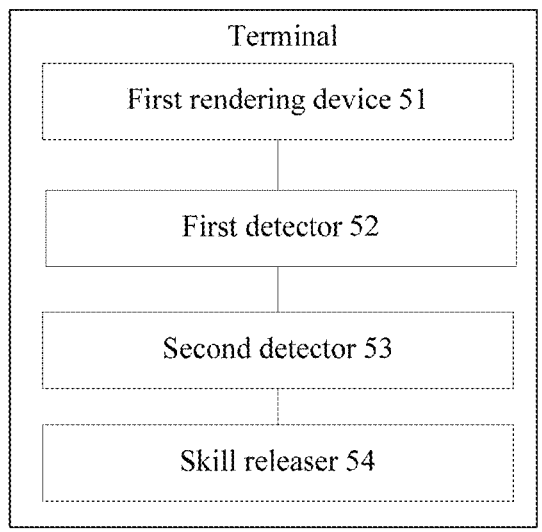
FIG. 10 is a schematic structural diagram of an exemplary terminal according to some embodiments of the present disclosure.

Various embodiments of the present disclosure provide a terminal. Computer readable instructions such as a software application may be executed on a processor of a terminal and rendering is performed and displayed on a display of the terminal, to provide a graphical user interface. The processor, the graphical user interface, and/or the software application are implemented in a game system. As shown in FIG. 10, the terminal further includes:

a first rendering device 51, configured to perform rendering in the graphical user interface, to obtain at least one virtual resource object;

a first detector 52, configured to: perform rendering at a pre-set location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object;

a second detector 53, configured to: control, when detecting a drag operation on the virtual joystick object, a skill release location of the skill object to be correspondingly adjusted in the graphical user interface, where, herein, when it is detected that the virtual joystick object is dragged to move by a skill-release operation gesture, the virtual joystick object deviates from a center of the skill-release control halo object, and a skill release control operation is triggered, so that a location of the skill-release control halo object remains unchanged, and a skill releasable range specified by a skill indicator object is completely covered by an area where the skill-release control halo object is located; and a skill releaser 54, configured to perform a skill release operation on the skill object when a release operation of the drag operation is detected, where, herein, the skill release operation is performed on the target character object within the skill releasable range according to a release location and/or direction of the skill object that is obtained through movement of the virtual joystick object with the skill-release operation gesture.

In an actual application of the embodiments of the present disclosure, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

Herein, rendering is performed at the pre-set location in the graphical user interface, to obtain the skill-release supplementary control object, so as to display the skill-release supplementary control object at a default fixed location. The skill-release supplementary control object can appear at the pre-set location, that is, the default fixed location, so that a user can be facilitated to respond rapidly in an information exchange process, thereby avoiding a response time wasted by the user for searching the graphical user interface.

Herein, as shown in FIG. 3, in a skill operation area 40 in a graphical user interface, a skill-release operation gesture applied to a skill object 1 is obtained, and rendering is performed, to obtain a skill-release supplementary control object. The skill-release supplementary control object includes a skill-release control halo object 41 and a virtual joystick object 42. A skill release control operation is subsequently triggered, so that a location of the skill-release control halo object 41 remains unchanged, and a skill releasable range specified by a skill indicator object 43 is completely covered by an area where the skill-release control halo object 41 is located.

For example, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. Herein, it should be noted that, the skill-release control halo object and the virtual joystick object used in this specification are only examples of a skill release controller object and a joystick object. A skill release controller object and a joystick object that are obtained by performing rendering in a graphical user interface include, but are not limited to, a shape of a wheel, an annular shape, a ring shape, and other shapes, as long as objects that may be configured to implement skill control can be implemented.

A schematic diagram of a UI effect interface shown in FIG. 3 is obtained by settings shown in FIG. 4. FIG. 4 is a schematic diagram of a system setting interface. When a user selects an option to set a wheel appearance location to a fixed location, to match a setting of the user, a UI shown in FIG. 3 is obtained by performing rendering subsequently. In the UI, a center of the joystick deviates from a center of the wheel, and the skill release control operation is triggered, so that the location of the wheel remains unchanged, and the skill releasable range specified by the skill indicator is completely covered by the area where the wheel is located.

Herein, in the UI shown in FIG. 3, when moving with the skill-release operation gesture, when the virtual joystick object moves towards the upper right corner of the wheel, skill release is performed, within the skill releasable range, on a character object that appears at the upper right corner.

In a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to the UI shown in FIG. 3. Herein, it should be noted that, the UI shown in FIG. 3 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a fixed location. For example, for the versus mode between multiple online users, the multiple users are grouped into different groups, each group includes at least one group member, and the different groups are marked as at least a first group (for example, our group) and a second group (for example, an opponent group). When there is only one person in our group, and there is also only one person in the opponent group, it is the "1 to 1" mode mentioned above. When there are only three persons in our group, and there are also three persons in the opponent group, it is the "3 to 3" mode mentioned above. When there are only five persons in our group, and there are also only five persons in the opponent group, it is the "5 to 5" mode mentioned above. Certainly, for the opponent group and our group, it is not necessarily to deploy a same number of persons, and different numbers of persons may be deployed.

In an implementation of this exemplary embodiment of the present disclosure, the terminal further includes:

a calibrator, configured to: obtain a first pre-set policy when it is detected that the drag operation on the virtual joystick object makes a current first coordinate location be out of the radiation range of the skill-release control halo object, and map the first coordinate location to a second coordinate location according to the first pre-set policy, where the second coordinate location is within the radiation range of the skill-release control halo object, where the skill releaser is further configured to perform the skill release operation on the skill object in the area where the skill-release control halo object is located.

In an implementation of this exemplary embodiment of the present disclosure, the calibrator is further configured to: meet the pre-set condition when the first coordinate location is at an edge of the area where the skill-release control halo object is located, or meet the pre-set condition when the first coordinate location is out of the area where the skill-release control halo object is located, where the second coordinate location is in the area where the skill-release control halo object is located.

In an implementation of this exemplary embodiment of the present disclosure, the skill releaser is further configured to:

determine, when it is detected that the virtual joystick object moves with the skill-release operation gesture, when the skill-release operation gesture changes to a slide release state from a slide state, that it is a skill release operation currently; and select, from at least one character object within a skill releasable range centering around a current user character object, a target character object satisfying a second pre-set policy, and perform, on the target character object, the skill release operation on the skill object.

In an implementation of this exemplary embodiment of the present disclosure, the terminal further includes:

a sensitivity setting unit, configured to set, or update, according to a user requirement, a drag speed value of movement of the virtual joystick object along with a skill-release operation gesture, to conform to a change speed of a skill releasable range specified by a skill indicator object.

Various embodiments of the present disclosure provide a terminal. Computer readable instructions such as a software application may be executed on a processor of a terminal and rendering is performed and displayed on a display of the terminal, to provide a graphical user interface. The processor, the graphical user interface, and/or the software application are implemented in a game system. The terminal further includes:

a first rendering device, configured to perform rendering in the graphical user interface, to obtain at least one virtual resource object;

a first detector, configured to: determine, when detecting a skill-release trigger gesture on at least one skill object located in at least one skill operation area in the graphical user interface, a wheel rendering location according to a detected touch or slide, and perform rendering at the wheel rendering location in the graphical user interface, to obtain a skill-release supplementary control object, the skill-release supplementary control object including a skill-release control halo object and a virtual joystick object located within a radiation range of the skill-release control halo object;

a second detector, configured to: control, when detecting a drag operation on the virtual joystick object, a skill release location of the skill object to be correspondingly adjusted in the graphical user interface, where, herein, when it is detected that the virtual joystick object moves along with a skill-release operation gesture, the virtual joystick object overlaps a center of the skill-release control halo object, so that the skill-release control halo object synchronously moves with the virtual joystick object with a touch or a slide of a finger, and a skill releasable range specified by a skill indicator object is completely covered by the area where the skill-release control halo object is located; and a skill releaser, configured to perform a skill release operation on the skill object when a release operation of the drag operation is detected, where, herein, the skill release operation is performed on the target character object within the skill releasable range according to a release location and/or direction of the skill object that is obtained through movement of the virtual joystick object with the skill-release operation gesture.

In an actual application of the embodiments of the present disclosure, the virtual resource object is covered in various types of objects in the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill release by the user, and the like shall all fall within the protection scope of the "virtual resource object" of the embodiments of the present disclosure.

Herein, a first location (for example, the wheel rendering location) may be obtained with a touch or a slide of a finger, and rendering is performed at the first location in the graphical user interface, to obtain the skill-release supplementary control object, so as to display the skill-release supplementary control object at a changeable location with a touch or a slide of the finger. The skill-release supplementary control object can appear at a changeable location with a touch or a slide of the finger. Therefore, a requirement of a user having a habit of rapidly performing skill release by a slide of the finger, which is different from a requirement of a user having a habit of performing skill release at a fixed location and aiming in a stable control area to perform skill release, can be well met, so that the user is facilitated to respond rapidly in an information exchange process, thereby avoiding a response time wasted by the user for searching the graphical user interface.

Herein, as shown in FIG. 8, in a skill operation area 40 in a graphical user interface, a skill-release operation gesture applied to a skill object 1 is obtained, and rendering is performed, to obtain a skill-release supplementary control object. The skill-release supplementary control object includes a skill-release control halo object 41 and a virtual joystick object 42. A skill release control operation is subsequently triggered, so that the skill-release control halo object 41 synchronously moves with the virtual joystick object with a touch or a slide of a finger, and a skill releasable range specified by a skill indicator object 43 is completely covered by an area where the skill-release control halo object 41 is located.

For example, as shown in FIG. 8, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. Herein, it should be noted that, the skill-release control halo object and the virtual joystick object used in this specification are only examples of a skill release controller object and a joystick object. A skill release controller object and a joystick object that are obtained by performing rendering in a graphical user interface include, but are not limited to, a shape of a wheel, an annular shape, a ring shape, and other shapes, as long as objects that may be configured to implement skill control can be implemented.

A schematic diagram of a UI effect interface shown in FIG. 8 is obtained by settings shown in FIG. 9. FIG. 9 is a schematic diagram of a system setting interface. When a user selects an option to set a wheel appearance location to a finger location, to match a setting of the user, a UI shown in FIG. 8 is obtained by performing rendering subsequently. In the UI, a center of the joystick overlaps a center of the skill-release control halo object, and the skill release control operation is subsequently triggered, so that the skill releasable range specified by the skill indicator object is completely covered by the area where the skill-release control halo object is located.

Herein, in the UI shown in FIG. 8, when moving with the skill-release operation gesture, when the virtual joystick object moves towards the upper right corner of the wheel, skill release is performed, within the skill releasable range, on a character object that appears at the upper right corner.

In a process of implementing control based on man-machine interaction in the graphical user interface, creation of different groups by multiple users in a one-to-one, one-to-many, and many-to-many forms to run different interaction modes is supported. Therefore, different interaction results are obtained. The different interaction modes include a versus mode between multiple online users, and further include an offline versus mode without an Internet connection.

The versus mode between multiple users and the offline versus mode without an Internet connection are both applicable to the UI shown in FIG. 8. Herein, it should be noted that, the UI shown in FIG. 8 is obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill release location and direction are determined by using a wheel at a changeable location. For example, for the versus mode between multiple online users, the multiple users are grouped into different groups, each group includes at least one group member, and the different groups are marked as at least a first group (for example, our group) and a second group (for example, an opponent group). When there is only one person in our group, and there is also only one person in the opponent group, it is the "1 to 1" mode mentioned above. When there are only three persons in our group, and there are also three persons in the opponent group, it is the "3 to 3" mode mentioned above. When there are only five persons in our group, and there are also only five persons in the opponent group, it is the "5 to 5" mode mentioned above. Certainly, for the opponent group and our group, it is not necessarily to deploy a same number of persons, and different numbers of persons may be deployed.

In an implementation of this exemplary embodiment of the present disclosure, the skill releaser is further configured to:

determine, when it is detected that the virtual joystick object moves with the skill-release operation gesture, when the skill-release operation gesture changes to a slide release state from a slide state, that it is a skill release operation currently; and select, from at least one character object within a skill releasable range centering around a current user character object, a target character object satisfying a second pre-set policy, and perform, on the target character object, the skill release operation on the skill object.

In an implementation of this exemplary embodiment of the present disclosure, the terminal further includes:

a sensitivity setting unit, configured to set, or update, according to a user requirement, a drag speed value of movement of the virtual joystick object along with a skill-release operation gesture, to conform to a change speed of a skill releasable range specified by a skill indicator object.

Figure 11:
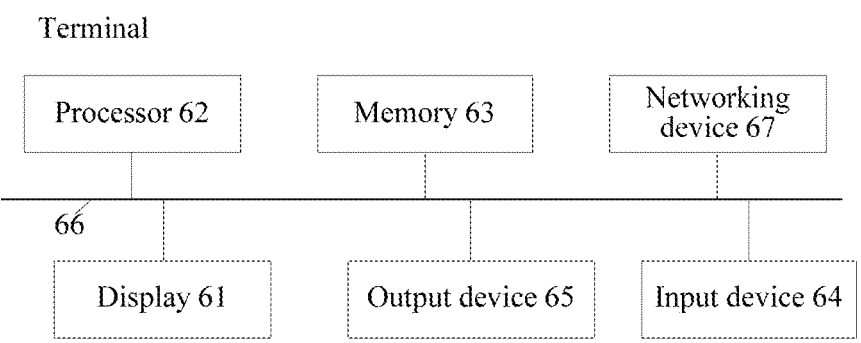
FIG. 11 is a schematic structural diagram of another exemplary terminal according to some embodiments of the present disclosure.

Various embodiments of the present disclosure provide a terminal. As shown in FIG. 11, the terminal includes: a display 61 and a processor 62. The display 61 is configured to: execute a software application on the processor of the terminal and then perform rendering on the software application, to obtain a graphical user interface. The graphical user interface is configured to facilitate control processing in man-machine interaction. The processor 62 is configured to perform the information processing method in the embodiments of the present disclosure. The processor, the graphical user interface, and the software application are implemented in a game system.

In this exemplary embodiment, the terminal further includes: a memory 63, an input device 64 (for example, a peripheral device such as a collection device including a camera, a microphone, and a headset; a mouse, a joystick, or a desktop computer keyboard; or a physical keyboard or a touchscreen on a notebook computer or a tablet computer), an output device 65 (for example, an audio output device or a video output device including a speaker, a headset, and the like), a bus 66, and a networking device 67. The processor 62, the memory 63, the input device 64, the display 61, and the networking device 67 are connected by using the bus 66, and the bus 66 is used for data transmission and communication between the processor 62, the memory 63, the display 61, and the networking device 67.

The input device 64 is mainly configured to obtain an input operation of a user, and the input device 64 may vary with the terminal. For example, when the terminal is a PC, the input device 64 may be an input device such as a mouse or a keyboard; when the terminal is portable device such as a smartphone or a tablet computer, the input device 64 may be a touchscreen. The networking device 67 is used by multiple terminals and a server to connect and upload and download data by using a network, and used by multiple terminals to connect and perform data transmission by using a network.

The server may be formed by a cluster system, and to implement functions of various units, the functions may be combined or functions of the units are separately provided in an electronic device. Either the terminal or the server at least includes a database for storing data and a processor for data processing, or includes a storage medium disposed in the server or a storage medium that is disposed separately. For the processor for data processing, during processing, a microprocessor, a central processing unit (CPU), a digital signal processor (DSP), or a field programmable gate array (FPGA) may be used for implementation. The storage medium includes an operation instruction, the operation instruction may be computer executable code, and steps in the procedure of the information processing method in the embodiments of the present disclosure are implemented by using the operation instruction.

Various embodiments of the present disclosure provide a storage medium. A computer executable instruction is stored in the computer storage medium, and the computer executable instruction is configured to perform the information processing method in the embodiments of the present disclosure.

This exemplary embodiment of the present disclosure is described below by using an actual application scenario as an example.

This application scenario is related to Multiplayer Online Battle Arena Games (MOBA). In MOBA, related terms are as follows: 1) UI layer, that is, an icon in a graphical user interface; 2) skill indicator: a special effect, a halo, or an operation used to supplement skill release; 3) lens, which may be understood as a camera in the game; 4) mini map: a scaled-down version of a large map, which may be understood as a radar map, where information and locations of two parties are displayed in the map; 5) wheel: a halo displayed above a skill key when the skill key is pressed; and 6) virtual joystick: a control for an operation and locating in the wheel.

In this application scenario, in current game products of the phone game MOBA, for skill release, a manner that is usually used is a manner of automatically selecting a target by a system, but with gradual upgrade of products, some game products begin to use a manner of setting a supplementary spellcasting joystick in a local UI, to select a skill release direction and location. However, users have different use habits, one user requirement is performing targeted attack in a stable control area (when a location of the joystick is fixed), and another user requirement is performing attack with a rapid touch or slide of a finger (when the finger rapidly moves). In an information exchange process in which a battle is controlled by using a mobile device, for the case in which the location of the supplementary spellcasting joystick in the game is fixed, due to a limitation of a screen of the mobile device, the joystick is not aligned with a center of a skill key, and in a spellcasting process, a player cannot accurately locate a location and a direction of a skill indicator in the game scene simply and directly using a slide of a finger. Similarly, because the location of the spellcasting joystick is fixed, the player cannot release a trajectory-type skill by rapidly sliding the finger. Consequently, a speed and accuracy of skill release by the player are greatly lowered, and a problem of distortion of a touch sense is caused. When the player expects to rapidly perform skill release in this spellcasting manner, the system cannot provide a clear target selection rule. As a result, the player may possibly track a target out of a skill spellcasting range when tapping to perform skill release, causing that an operation is inconsistent with a target, and severely affecting game experience. The supplementary spellcasting joystick at the fixed location has relatively poor control effect for an edge of the screen, and when the finger is at an edge of the supplementary joystick, skill release is canceled. Therefore, it is difficult to use for some range-type skills released to specified locations. Due to size problems of a wheel and a joystick that appear near a skill key, a manner of dragging by a finger on the mobile device for locating, a problem that a feedback of a touch sense and precision of an actual operation are different to some extent.

Figure 12:
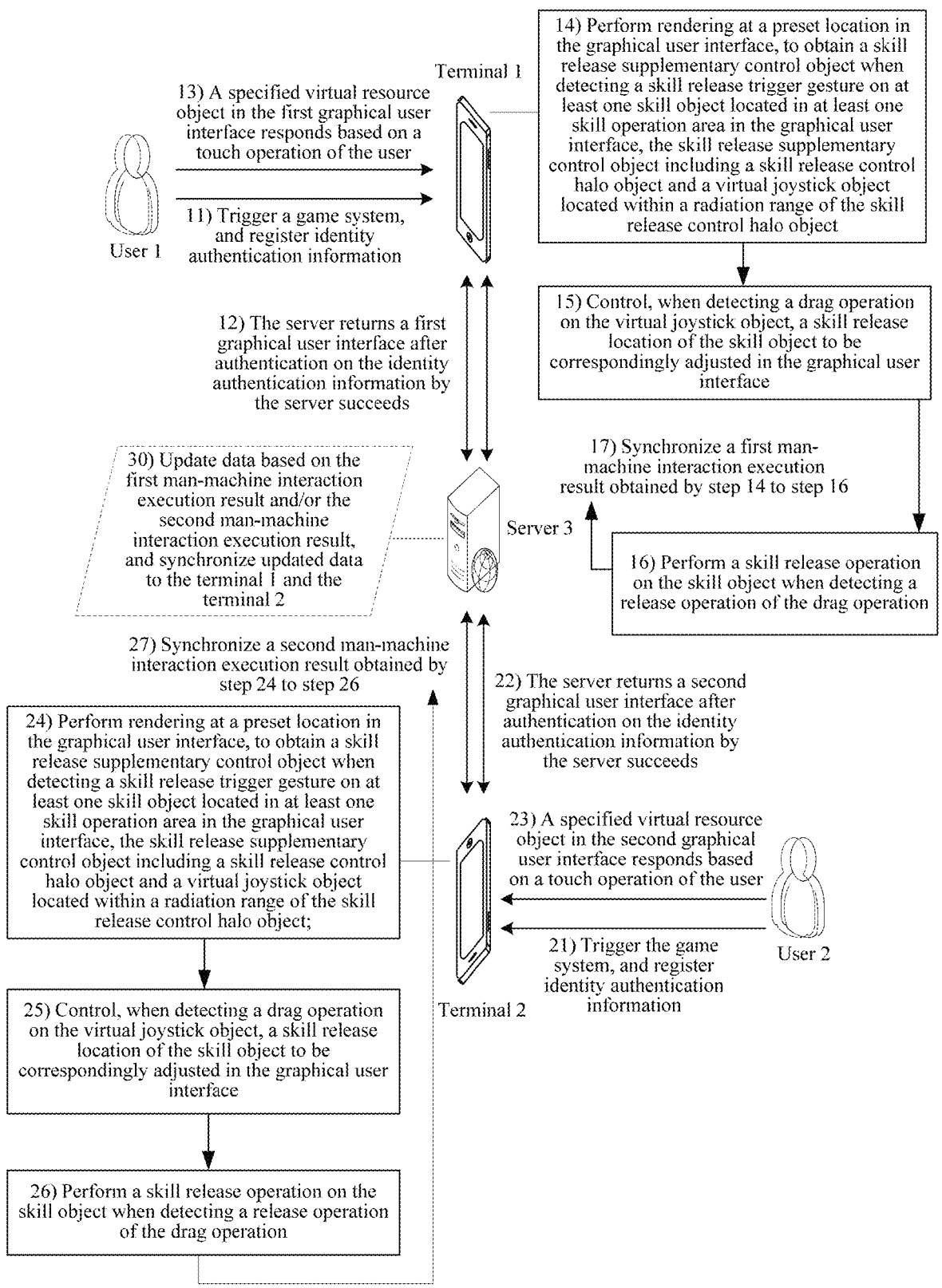
FIG. 12 is a schematic flowchart of implementation of an exemplary application scenario according to some embodiments of the present disclosure.

An exemplary interaction procedure is shown in FIG. 12. By a system setting, accurate skill release can be performed by directly sliding the joystick. By an enemy searching mechanism, a problem of performing rapid skill release by tapping in a battle is solved, a problem that the player cannot self-define a supplementary wheel appearance location is solved, and a problem that skill release cannot accurately performed by the joystick at an edge of the wheel is solved. By using a sensitivity-based mechanism, a problem of locating accuracy of the supplementary wheel and the joystick is solved.

User operations presented in the interaction procedure shown in FIG. 12 and UI presentation includes: adding a setting of the supplementary wheel appearance location to the system setting in this solution. The player can self-define, according to a requirement and a habit of the player, the skill wheel appearance location after a skill key is tapped, so that multiple disadvantages of skill release are optimized. A first solution is: obtaining a stable control area and a standardized touch sense by setting the wheel to appear at a fixed location. In such a manner, a release error may be generated due to a problem of an angle of the finger from the perspective of direction calibration, but it can be ensured that an area of the wheel can cover the entire range of an indicator, so that the manner adapts to a player having a habit of performing spellcasting directed to a spellcasting area (a deviation between the joystick and the center of the wheel should be noticed). A second solution is: accurately locating the center of wheel by setting the wheel to appear at a finger location. In this case, regardless of a dragging direction of the finger, in the scene, the indicator moves absolutely according to the dragging direction of the finger, and accurately performs skill release towards the direction, so that the manner adapts to a player having a habit of performing spellcasting by a rapid slide (it should be noted that, the joystick overlaps the center of the wheel center at a point).

Figure 13:
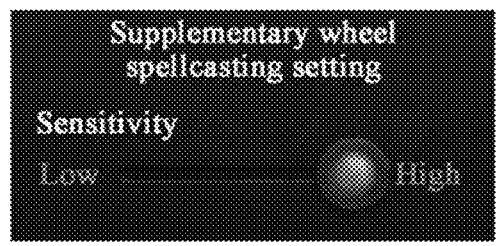
FIG. 13 is a schematic diagram of an exemplary setting interface of a sensitivity-based system according to some embodiments of the present disclosure.

In this exemplary embodiment, a setting that skill release is canceled when the player drags the joystick to be out of the edge of the wheel is discarded, thereby avoiding a mis-operation problem due to an insufficient operational area of the mobile device. When the player drags the joystick to be at the edge of the wheel or even be out of the range of the wheel, the system fixes an actual location of the joystick within the range of the wheel disk by using an algorithm, thereby preventing a skill from being canceled somehow due to dragging took fast or a mis-operation. In this exemplary embodiment, a relatively smart enemy searching mechanism by tapping is further used. When the player taps a skill rapidly, the system may select a target having the highest priority as a skill for release according to a determined efficient logic, and does not perform targeted attack on a previously attacked target, so that the player can perform rapid skill release in this manner, and when the player needs to perform accurate predetermined spellcasting, the player can drag the joystick on the wheel by long press for implementation. This exemplary embodiment further introduces a sensitivity-based mechanism similar to a speed-based mechanism or sensitivity-based mechanism of a mouse for operating a computer, so that the player can freely set a drag speed of the joystick on the wheel, as shown in FIG. 13, to meet requirements of different players for speeds of change of an indicator.

FIG. 12 is a schematic flowchart of specific interaction in an information processing method in this application scenario. As shown in FIG. 12, in this application scenario, a terminal 1, a terminal 2, and a server are included. The user 1 performs triggering and control by using the terminal 1, and the user 2 performs triggering and control by using the terminal 2; and the method includes the following exemplary steps.

For the user 1, exemplary step 11 to step 17 are included.

In S11: The user 1 triggers a game system by using the terminal 1, and registers identity authentication information, where the identity authentication information may be a user name and a password.

In S12: The terminal 1 transmits the obtained identity authentication information to the server 3, and the server 3 performs identity authentication, and returns a first graphical user interface to the terminal 1 after the identity authentication succeeds, where the first graphical user interface includes a virtual resource object.

In S13: A specified virtual resource object (such as an SMS message object in FIG. 3) can respond based on a touch operation of the user 1, and performs a series of virtual operations in step 14 to step 17.

In S14: Performing rendering at a pre-set location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object.

In S15: Controlling, when detecting a drag operation on the virtual joystick object, a skill release location of the skill object to be correspondingly adjusted in the graphical user interface.

In S16: Performing a skill release operation on the skill object when detecting a release operation of the drag operation.

In S17: Synchronizing an execution result obtained by performing step 14 to step 16 to the server, or instantly transfer the execution result to the terminal 2 by using the server, or directly forward the execution result to the terminal 2, so that the user 2 that logs in to the game system by using the terminal 2 can respond to the virtual operation of the user 1, so as to implement interaction between multiple terminals. In this application scenario, only interaction between two terminals is used as an example, and during an actual operation, interaction between multiple terminals may be not limited to interaction between the two terminals in this example.

For the user 2, exemplary step 21 to step 27 are included for the user 1.

In S21: The user 2 triggers the game system by using the terminal 2, and registers identity authentication information, where the identity authentication information may be a user name and a password.

In S22: The terminal 1 transmits the obtained identity authentication information to the server 3, and the server 3 performs identity authentication, and returns a second graphical user interface to the terminal 2 after the identity authentication succeeds, where the second graphical user interface includes a virtual resource object.

In S23: A specified virtual resource object (such as an SMS message object in FIG. 3) can respond based on a touch operation of the user 2, and performs a series of virtual operations in step 24 to step 27.

In S24: Performing rendering at a pre-set location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object.

In S25: Controlling, when detecting a drag operation on the virtual joystick object, a skill release location of the skill object to be correspondingly adjusted in the graphical user interface.

In S26: Performing a skill release operation on the skill object when detecting a release operation of the drag operation.

In S27: Synchronizing an execution result obtained by performing step 24 to step 26 to the server, or instantly transfer the execution result to the terminal 1 by using the server, or directly forward the execution result to the terminal 1, so that the user 1 that logs in to the game system by using the terminal 1 can respond to the virtual operation of the user 2, so as to implement interaction between multiple terminals. In this application scenario, only interaction between two terminals is used as an example, and during an actual operation, interaction between multiple terminals may be not limited to interaction between the two terminals in this example.

In S30: An optional step: Synchronizing or transferring, after receiving a first man-machine interaction execution result obtained by exemplary step 14 to step 17 and/or a second interaction execution result obtained by exemplary step 24 to step 27, the first man-machine interaction execution result and/or the second interaction execution result to corresponding terminals.

The technical solutions in the embodiments of the present disclosure are implemented as follows.

In the information processing method in the embodiments of the present disclosure, Computer readable instructions such as a software application may be executed on a processor of a terminal and rendering is performed and displayed on a display of the terminal, to provide a graphical user interface. The processor, the graphical user interface, and/or the software application are implemented in a game system. The method includes: performing rendering in the graphical user interface, to obtain at least one virtual resource object; performing rendering at: at least one of a pre-set location and a wheel rendering location in the graphical user interface, to obtain a skill-release supplementary control object when detecting a skill-release trigger gesture on at least one skill object located in at least one skill operation area in the graphical user interface, the skill-release supplementary control object including a skill-release control halo object and a virtual joystick object located within a radiation range of the skill-release control halo object; controlling, when detecting a drag operation on the virtual joystick object, a skill release location of the skill object to be correspondingly adjusted in the graphical user interface; and performing a skill release operation on the skill object when detecting a release operation of the drag operation.

As disclosed, in an information exchange process, rendering is performed at a pre-set location in a graphical user interface, to obtain a skill-release supplementary control object when a skill-release trigger gesture on at least one skill object located in at least one skill operation area in the graphical user interface is detected. The skill-release supplementary control object can appear at the pre-set location, that is, a default fixed location, so that a user can be facilitated to respond rapidly in the information exchange process, thereby avoiding a response time wasted by the user for searching the graphical user interface. A skill release location of the skill object is controlled, when a drag operation on a virtual joystick object is detected, to be correspondingly adjusted in the graphical user interface, so that even when the virtual joystick object deviates from a center of a skill-release control halo object, a location of the skill-release control halo object always remains unchanged. Because the location of the skill-release control halo object remains unchanged, a control area is stable, which can facilitate the user to rapidly specify a skill releasable range. A skill release operation is performed on the skill object when a release operation of the drag operation is detected, so that the skill release operation can be accurately performed on the skill object within the skill releasable range according to a release location and/or direction of the skill object that is obtained by dragging the virtual joystick object to move by a skill-release operation gesture, thereby avoiding occurrence of a large quantity of mis-operations, and improving precision and accuracy of interaction processing.

In the embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present disclosure may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a portable storage device, a read-only memory (ROM), a random access memory (RAM), a magnetic disk, or an optical disc.

Alternatively, when the integrated unit is implemented in a form of a software functional module and sold or used as an independent product, the integrated unit may be stored in a computer-readable storage medium. Based on such an understanding, the technical solutions of the embodiments of the present disclosure essentially, or the part contributing to the existing technology may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method of operating objects displayed on a graphical user interface, applied to a terminal including at least a memory and a processor, the method comprising:
  displaying on the graphical user interface a skill indicator object;
  performing rendering, at one of a pre-set location and a wheel rendering location on the graphical user interface, to obtain a skill-release supplementary control object, upon detecting a skill-release trigger gesture on a skill object displayed on the graphical user interface, the skill-release supplementary control object including a skill-release control halo object and a virtual joystick object located within a radiation range of the skill-release control halo object;
  positioning the skill-release control halo object within the skill indicator object;
  coupling the skill-release control halo object to the skill indicator object to be movable together relative to the graphical user interface and to the skill object;
  moving the skill-release control halo object as coupled to the skill indicator object together relative to the skill object, upon detecting a drag operation on the virtual joystick object, wherein the skill-release control halo object stays constant in position relative to the skill indicator object while moving relative to the graphical user interface and the skill object; and
  performing a skill release operation on the skill object upon detecting a release operation of the drag operation.

2. The method according to claim 1, wherein detecting the drag operation on the virtual joystick object includes:
  obtaining a first pre-set policy, upon detecting that the drag operation on the virtual joystick object makes a current first coordinate location of the virtual joystick object outside of the radiation range of the skill-release control halo object; and
  mapping the virtual joystick object to a second coordinate location according to the first pre-set policy, wherein the second coordinate location is within the radiation range of the skill-release control halo object.

3. The method according to claim 1, wherein performing the skill release operation on the skill object according to the release operation of the drag operation includes:

identifying, within a skill releasable range defined by the skill indicator object, a target character object satisfying a second pre-set policy; and performing, on the target character object, the skill release operation as on the skill object.

4. The method according to claim 2, wherein performing the skill release operation on the skill object according to the release operation of the drag operation includes:

identifying, within a skill releasable range defined by the skill indicator object, a target character object satisfying a second pre-set policy; and performing, on the target character object, the skill release operation as on the skill object.

5. The method according to claim 1, further comprising: adjusting, according to a user requirement, a drag movement speed of the virtual joystick object in response to the skill-release operation gesture.

6. The method according to claim 1, wherein: the wheel rendering location is determined according to a touching or a sliding motion as detected.

7. The method according to claim 1, wherein a center of the skill-release control halo object is positioned to overlap a center of the virtual joystick object such that the skill-release control halo object is synchronously movable with the virtual joystick object.

8. A terminal, comprising: a memory, storing computer readable instructions for an information processing method; a display for providing a graphical user interface; and a processor, coupled to the memory and, when executing the program instructions, configured to:

display on the graphical user interface a skill indicator object;

perform rendering at one of a pre-set location and a wheel rendering location on the graphical user interface, to obtain a skill-release supplementary control object upon detecting a skill-release trigger gesture on a skill object located displayed on the graphical user interface, the skill-release supplementary control object including a skill-release control halo object and a virtual joystick object located within a radiation range of the skill-release control halo object;

position the skill-release control halo object within the skill indicator object;

couple the skill-release control halo object to the skill indicator object to be movable together relative to the graphical user interface and to the skill object;

move the skill-release control halo object as coupled to the skill indicator object together relative to the skill object, upon detecting a drag operation on the virtual joystick object, wherein the skill-release control halo object stays constant in position relative to the skill indicator object while moving relative to the graphical user interface and the skill object; and perform a skill release operation on the skill object when a release operation of the drag operation is detected.

9. The terminal according to claim 8, wherein the processor is further configured to:

obtain a first pre-set policy when it is detected that the drag operation on the virtual joystick object makes a current first coordinate location of the virtual joystick object outside of the radiation range of the skill-release control halo object; and map the virtual joystick object to a second coordinate location according to the first pre-set policy, wherein the second coordinate location is within the radiation range of the skill-release control halo object.

10. The terminal according to claim 9, wherein the processor is further configured to:

identify, within a skill releasable range defined by the skill indicator object, a target character object satisfying a second pre-set policy; and perform, on the target character object, the skill release operation as on the skill object.

11. The terminal according to claim 8, wherein the processor is further configured to:

identify, within a skill releasable range defined by the skill indicator object, a target character object satisfying a second pre-set policy; and perform, on the target character object, the skill release operation as on the skill object.

12. The terminal according to claim 8, wherein the processor is further configured to:

adjust, according to a user requirement, a drag movement speed of the virtual joystick object in response to the skill-release operation gesture.

13. The terminal according to claim 8, wherein: the wheel rendering location is determined according to a touching or sliding motion as detected.

14. The terminal according to claim 8, wherein a center of the skill-release control halo object is positioned to overlap a center of the virtual joystick object such that the skill-release control halo object is synchronously movable with the virtual joystick object.

15. A non-transitory computer-readable storage medium comprising computer-executable program instructions for, when executed by a processor, performing an information processing method, the method including:

displaying on the graphical user interface a skill indicator object;

performing rendering, at one of a pre-set location and a wheel rendering location on the graphical user interface, to obtain a skill-release supplementary control object, upon detecting a skill-release trigger gesture on a skill object displayed on the graphical user interface, the skill-release supplementary control object including a skill-release control halo object and a virtual joystick object located within a radiation range of the skill-release control halo object;

positioning the skill-release control halo object within the skill indicator object;

coupling the skill-release control halo object to the skill indicator object to be movable together relative to the graphical user interface and the skill object;

moving the skill-release control halo object as coupled to the skill indicator object together relative to the skill object, upon detecting a drag operation on the virtual joystick object, wherein the skill-release control halo object stays constant in position relative to the skill indicator object while moving relative to the graphical user interface and the skill object; and performing a skill release operation on the skill object upon detecting a release operation of the drag operation.

16. The non-transitory computer-readable storage medium according to claim 15, wherein detecting the drag operation on the virtual joystick object includes:

obtaining a first pre-set policy, upon detecting that the drag operation on the virtual joystick object makes a current first coordinate location of the virtual joystick object be outside of the radiation range of the skill-release control halo object; and mapping the virtual joystick object to a second coordinate location according to the first pre-set policy, wherein the second coordinate location is within the radiation range of the skill-release control halo object.

17. The non-transitory computer-readable storage medium according to claim 15, wherein performing the skill release operation on the skill object according to the release operation of the drag operation includes:
   identifying, within a skill releasable range defined by the skill indicator object, a target character object satisfying a second pre-set policy; and
   performing, on the target character object, the skill release operation as on the skill object.

18. The non-transitory computer-readable storage medium according to claim 15, wherein the method further includes:
   adjusting, according to a user requirement, a drag movement speed of the virtual joystick object in response to the skill-release operation gesture.

19. The non-transitory computer-readable storage medium according to claim 15, wherein: the wheel rendering location is determined according to a touching or sliding motion as detected.

20. The non-transitory computer-readable storage medium according to claim 15, wherein a center of the skill-release control halo object is positioned to overlap a center of the virtual joystick object such that the skill-release control halo object is synchronously movable with the virtual joystick object.

* * * * *